2,835,693

PREPARATION OF ESTERS OF BORONIC AND BORINIC ACIDS

Vernon W. Buls and Richard I. Thomas, Walnut Creek, Calif., assignors to Shell Development Company, New York, N. Y., a corporation of Delaware No Drawing. Application December 19, 1955
Serial No. 553,736

6 Claims. (Cl. 260—462)

This invention relates to a method for preparing alkyl esters of oxygen acids of boron containing at least one hydrocarbyl group attached directly to the boron atom by a carbon-to-boron bond—i. e., the hydrocarbylboronic acids and dihydrocarbylborinic acids.

As is pointed out in United States Patent No. 2,720,449, issued October 11, 1955, to F. S. Arimoto, alkyl esters of hydrocarbylboronic acids are of substantial value as antiknock additives for fuel compositions. However, as is pointed out in this patent, such boronates were prepared either by esterifying the corresponding free boronic acid or by reacting equivalent amounts of the required Grignard reagent with a borate ester. Both of these methods involve the use of a Grignard reagent for coupling the hydrocarbyl group directly to the boron atom. The use of a Grignard reagent for such a purpose is beset with several operational difficulties, including the necessary preparation of the Grignard reagent and recovery of the metallic salt from the reaction mixture after the reaction is completed; moreover, if large amounts of the esters are required, preparation thereof via the use of a Grignard reagent is quite expensive.

We have discovered that alkyl esters of hydrocarbylboronic and dihydrocarbylborinic acids may be prepared in a simple, effective manner from commercially available, relatively inexpensive materials. We have discovered that when a trialkyl borate is mixed with a trihydrocarbylborine in the presence of a catalytic amount of a compound containing a boron-to-halogen linkage at a moderately elevated temperature, alkyl esters of the corresponding hydrocarbylboronic acid and dihydrocarbylborinic acids are formed.

The reaction underlying applicants' new process is represented by the formula:

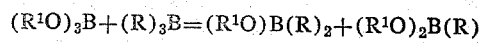

wherein $R^1$ represents an alkyl group and R represents a hydrocarbyl group. The products of the reaction may be considered to be represented, generally, by the formula

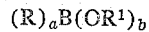

wherein $a$ is 1 or 2, with the proviso that $a+b=3$.

Where all of the groups, $R^1$ are not the same and/or all the groups R are not the same, a wide variety of these esters may be formed. By proper choice of the groups $R^1$ and R in the initial reactants, any desired product is obtained.

As the trialkyl borate reactant, there may be used any trialkyl borate—i. e., the alkyl groups may all be the same, or they may be different; they may be of straight-chain or of branched-chain or of cyclic configuration, and each may contain any number of carbon atoms. It is preferred, however, that the alkyl groups contain not more than about 10 carbon atoms each. Exemplary of this preferred subgenus of trialkyl borates are trimethyl borate, triethyl borate, tributyl borate, trihexyl borate, trioctyl borate, tridecyl borate, and the branched-chain homologs of these compounds, methyl dibutyl borate, butyl diethyl borate, ethyl dioctyl borate, isopropyl dibutyl borate, cyclohexyl diethyl borate, and the like.

Any trihydrocarbylborine free from aliphatic carbon-to-carbon multiple linkages (i. e., free from ethylenic and acetylenic linkages) may be used; that is to say, the hydrocarbyl groups may all be the same or they may be different; they may be either aliphatic (including cycloaliphatic) or aromatic in character, and may contain any number of carbon atoms. The aliphatic hydrocarbyl groups may be either straight-chain or branched-chain in configuration—or they may be cycloaliphatic groups, such as the cycloalkyl groups. Suitable hydrocarbyl groups thus include the alkyl groups, the cycloalkyl groups, and aryl-substituted alkyl groups; also included are aromatic groups such as aryl groups and such mixed groups as the alkaryl groups. It is preferred that each of the hydrocarbyl groups contain not more than about 10 carbon atoms. Exemplary of this preferred subgenus of trihydrocarbylborines are trimethylborine, triethylborine, tributylborine, trihexylborine, butyl dihexylborine, and the branched-chain alkyl homologs of these compounds, triphenylborine, tribenzylborine, tri-o-xylylborine, ethyl diphenylborine, diethyl phenylborine, cyclohexyl diethylborine, and the like.

Suitable as the catalyst for the reaction is any compound containing a boron-to-halogen linkage; it is preferred that the halogen be chlorine. Suitable as the catalyst, therefore, are the boron trihalides, particularly boron trichloride, the hydrocarbyl boron dihalides and dihydrocarbyl boron monohalides $(RB(X)_2$ and $(R)_2BX$, respectively, where R represents a hydrocarbyl group as hereinbefore previously defined and X represents a halogen atom). It is preferred that the hydrocarbyl group or groups of the catalyst be alkyl or aryl groups each containing less than about 10 carbon atoms.

The process of the invention is most conveniently carried out when the catalyst used has the same hydrocarbyl group or groups as those occurring in the borate, and/or borine reactants, for this will limit the number of different hydrocarbyl groups present in the reaction theatre, reducing the possibility of side reactions to give undesired and unuseable products, and simplifying the recovery of the desired product.

The amount of catalyst required is usually very small—an amount of catalyst amounting to from about 0.1% to about 5.0% by weight of the borate reactant normally being sufficient. Occasionally, it will be found desirable to use more than this amount of catalyst—up to about 10% by weight of the borate reactant; seldom will it be found necessary to exceed this amount.

In addition to the proper selection of the starting materials and the use of a catalyst, the desired product is obtained in high yield by proper selection of $(a)$, the ratio of the reactants, $(b)$, the reaction temperature, and $(c)$, the reaction time.

The reaction between the borine and the borate occurs according to the equation

wherein R and $R^1$ have the respective meanings already set out hereinbefore. It has been found that the molar ratio between the amount of boronate and borinate products in the final reaction mixture depends to a great extent upon the molar ratio between the amount of borate and borine reactants in the original mixture. It has been found that this relationship is substantially directly proportional—that is to say, if a molar excess of borate, relative to the borine, is present in the initial reaction mixture, the product will contain a like molar excess of boronate, relative to the borinate. Thus, if the molar ratio of borate to borine in the initial reaction mixture is about two to one, the product will contain about twice as much boronate as borinate, on a molar basis. The ratio of the reactants may be set at the beginning of the reaction and the mixture allowed to react without further addition of any reactant. In some cases, however, it may be desirable to remove and analyze aliquot portions of the reactant mixture and add additional amounts of one or the other of the reactants as necessary to obtain the desired product.

Many organic borates and borines tend to be somewhat unstable, hence it is desirable that the reaction temperature and reaction time be so chosen that undue decomposition of the reactants does not occur. In general, the shortest reaction time and lowest temperature compatible with reasonable rates and practical yields of the desired product should be used. Reaction temperatures of from about 150° to about 300° C. have been found satisfactory, temperatures of about 200° C. (±25° C.) being optimum. At these temperatures, reaction times of from about 3 or 4 hours to about 36 to 40 hours are satisfactory, it being the general rule that the higher the temperature used the shorter the reaction time.

The reaction is carried out simply by mixing the reactants and the catalyst, and heating the mixture at the chosen temperature for a period of time sufficient to permit the reaction to go to substantial completion. The system is kept anhydrous at all times, for water causes undesired side reactions which seriously reduce the yield of the desired product. It is also essential that molecular oxygen be excluded from the reaction zone, hence the reaction preferably is carried out in the presence of an inert gaseous atmosphere such as dry nitrogen. The reaction is normally carried out without the addition of any solvent; in some cases, however, it may be convenient to employ an inert anhydrous solvent for the reactants. Suitable as the solvent is any anhydrous liquid which is inert in the reaction mixture under the reaction conditions. The liquid alkanes, such as pentane, hexane, and the like are quite suitable, as are the halogenated saturated alkanes, such as methylene chloride, carbon tetrachloride, ethylene dichloride and the like. Benzene, its halogenation and nitration products, likewise are suitable, as are alkyl-substituted benzenes. The amount of solvent used should be sufficient to dissolve at least the major proportion of the reactants; preferably the reactants are completely in solution, and a moderate excess over this amount—sufficient to insure that the reaction mixture is readily fluid—is desirable.

The desired product normally is obtained by distillation of the reaction mixture.

The following examples are presented to illustrate practice of the process of the invention:

*Example I*

0.51 mole (61.5 grams) of trimethyl borate, 0.27 mole (49 grams) of tributylborine and 2 grams of butylboron dichloride were charged to an evacuated 300 cc. pressure vessel. The vessel was heated at 200° C. for 16 hours. Distillation of the product gave 0.17 mole (24 grams) of dimethyl butylboronate, boiling at 55° C. at 50 mm. mercury pressure. The product contained 8.36% weight of boron as compared to a theoretical value of 8.32% by weight boron ($C_6H_{15}O_2B$).

*Example II*

Repetition of Example I, substituting about 2 grams of boron trichloride for the butylboron dichloride of Example I as catalyst, results in substantially the same yields of boronate product.

In a similar manner butyl dibutylborinate and dibutyl butylboronate are formed by reacting tributylborine with tributyl borate in the presence of a catalytic amount of butylboron dichloride; phenyl diethylborinate and diphenyl ethylboronate are formed by reacting triphenylborate with triethylborine in the presence of a catalytic amount of diethylboron chloride; cyclohexyl dipropylborinate and biscyclohexyl propylboronate are formed by reacting tricyclohexyl borate with tripropylborine in the presence of a catalytic amount of propylboron dichloride; and isopropyl dibutylborinate and di-isopropyl butylboronate are formed by reacting tri-isopropyl borate with tributylborine in the presence of a catalytic amount of boron trichloride.

We claim as our invention:

1. A process for the preparation of alkyl esters of oxygen acids of boron, said esters having the formula $$(R)_aB(OR^1)_b$$

which process comprises heating together at a temperature of from about 150° C. to about 300° C., under anhydrous conditions and in the absence of molecular oxygen, a compound having the formula, $(R^1O)_3B$ and a compound having the formula $(R)_3B$, in the presence of a minor amount of a compound selected from the group consisting of the boron trihalides and compounds of the formula $(R)_cB(X)_d$ as catalyst, in said formulas, $R^1$ representing an alkyl group, R representing a hydrocarbon group containing up to 10 carbon atoms, free from aliphatic carbon-to-carbon multiple linkages selected from the class consisting of the alkyl groups, cycloalkyl groups, aryl groups, alkaryl groups and aralkyl groups, X representing a halogen atom, $a$ and $c$ each representing an integer of from 1 to 2, with the proviso that $a+b=3$, and $c+d=3$.

2. The process of claim 1 wherein the said heating together of the reactants is effected in an inert gaseous atmosphere.

3. A process for preparing alkyl esters of alkylboronic acids and dialkylborinic acids which comprises heating at a temperature of from about 150° C. to about 300° C., under anhydrous conditions and in the absence of molecular oxygen a mixture of a trialkyl borate and a trialkylborine in the presence of a minor amount of a boron trihalide as catalyst.

4. A process for preparing alkyl esters of alkylboronic acids and dialkylborinic acids which comprises heating at a temperature of from about 150° C. to about 300° C., under anhydrous conditions and in the absence of molecular oxygen a mixture of a trialkyl borate and a trialkylborine in the presence of a minor amount of an alkylborondihalide as catalyst.

5. A process for preparing dimethyl butylboronate which comprises heating under anhydrous conditions and in the absence of molecular oygen a mixture comprising tributylborine, trimethyl borate and a minor amount of an alkylboron dihalide as catalyst to a temperature of about 200° C.

6. The process according to claim 5 wherein the catalyst is butyl boron dichloride.

References Cited in the file of this patent

Johnson et al.: J. Amer. Chem. Soc. 60, pp. 105–121 (three articles) (1938).